United States Patent
Kikuchi et al.

(10) Patent No.: US 6,844,093 B2
(45) Date of Patent: Jan. 18, 2005

(54) FUEL CELL STACKING BODY

(75) Inventors: Hideaki Kikuchi, Kawachi-gun (JP);
Masahiko Sato, Utsunomiya (JP);
Toshiaki Ariyoshi, Utsunomiya (JP);
Yosuke Fujii, Kawachi-gun (JP);
Daisuke Wachi, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 231 days.

(21) Appl. No.: 10/256,457

(22) Filed: Sep. 26, 2002

(65) Prior Publication Data

US 2003/0064261 A1 Apr. 3, 2003

(30) Foreign Application Priority Data

Sep. 28, 2001 (JP) ........................................ 2001-298811

(51) Int. Cl.⁷ ................................................ H01M 8/04
(52) U.S. Cl. ............................ 429/23; 429/22; 429/32; 429/34
(58) Field of Search .............................. 429/23, 22, 32, 429/34

(56) References Cited

U.S. PATENT DOCUMENTS

2003/0048090 A1 * 3/2003 Sato et al. .................. 320/101

FOREIGN PATENT DOCUMENTS

| JP | 09-283166 | 10/1997 | |
| JP | 11-339828 | * 12/1999 | ............ H01M/8/02 |

* cited by examiner

Primary Examiner—Patrick Ryan
Assistant Examiner—Angela J. Martin
(74) Attorney, Agent, or Firm—Lahive & Cockfield, LLP; Anthony A. Laurentano, Esq.

(57) ABSTRACT

There is provided a fuel cell stacking body that allows a connector unit to be used even when the thickness of the fuel cells has been made thinner. A fuel cell stacking body is provided with stacked fuel cells that each have a membrane electrode assembly and separators that sandwich this membrane electrode assembly. The fuel cells generate electricity when fuel gas and oxidizer gas are supplied. The separators of the fuel cells are provided with terminals that enable voltage to be measured by being connected to connectors that are connected an external voltage measuring apparatus. One of the voltage measuring sections is formed at a different position, with respect to the stacking direction, from the voltage measuring section that is adjacent in the stacking direction. The spacing between terminals that are at the same position with respect to the stacking direction is kept at a distance that allows a connector unit formed by grouping together a plurality of connectors to be inserted.

6 Claims, 11 Drawing Sheets

FUEL CELL STACKING BODY

BACKGROUND OF THE INVENTION

1. Field of the Invention

The present invention relates to a fuel cell stacking body formed by stacking fuel cells that have an electrode assembly and separators that sandwich the electrode assembly, and in which the separators are provided with voltage measuring sections that enable a voltage to be measured.

2. Description of the Related Art

In recent years, fuel cells have attracted attention as a new power source for vehicles and the like. Generally, a fuel cell is formed by sandwiching between separators a membrane electrode assembly (MEA) that is formed by disposing gas diffusion electrode layers on either side of a solid polymer electrolyte membrane. In order to generate power using this type of fuel cell, an electrochemical reaction is generated by supplying gas fuel (for example, oxygen gas) to one gas diffusion electrode layer of the fuel cell, and supplying oxidizer gas (for example, air that contains oxygen) to the other gas diffusion electrode layer. Because, basically, the only by-product of this power generation is harmless water, this type of fuel cell is receiving attention because of both its benefits to the environment and its utilization efficiency.

Using a single fuel cell it is difficult to obtain sufficient power to drive a vehicle. Therefore, investigations are being carried out on the forming of a fuel cell stacking body by stacking a plurality of fuel cells, and then mounting this fuel cell stacking body in a vehicle in order to obtain sufficient power to drive the vehicle.

In this case, in order to monitor whether or not each of the fuel cells forming the fuel cell stacking body is generating power normally, it is extremely important that the voltage of the fuel cells be detected. Conventionally, as is shown in FIG. 10, protrusion shaped and groove shaped voltage measurement terminals 2 are provided on the separators of the fuel cell stacking body 1. By connecting the voltage measurement terminals 2 to connectors connected to a voltage measuring apparatus (not shown), the voltage of the separators on which the terminals are provided is measured, thereby enabling the voltage of each fuel cell to be detected.

However, the following problems arise in the conventional fuel cell. Namely, conventionally, the voltage measurement terminals 2 of each fuel cell are typically placed in series in the same position with respect to the stacking direction (see FIG. 10). Therefore, if connectors for connecting to the voltage measuring apparatus are provided separately for each voltage measurement terminal 2, the concern arises that the wiring connecting the connectors with the voltage measurement apparatus will become tangled up when the respective terminals 2 are connected to the connectors. In addition, because it is necessary to connect a connector to each one of the terminals 2, the task of making the connections is extremely onerous.

Accordingly, the use of a connector 4 obtained by forming a plurality of connectors 3 in the shape of a unit (i.e., a connector unit) so as to enable a plurality of terminals 2 to be connected in a single group is being examined. However, it is desired that the thickness of each fuel cell be made as thin as possible in order for the fuel cell stacking body 1 to be mounted in a vehicle, and this has inevitably resulted in a trend towards the spacing W between terminals being made as narrow as possible. Therefore, as is shown in the side cross-sectional view in FIG. 11, when the terminals 2 are arranged in series, if the spacing W between terminals 2 is narrow, the concern arises that the thickness X at the end portion side of the connector unit 4 will not be able to be secured sufficiently, resulting in the strength being insufficient. In addition, the concern also arises that the spacing Y between connector units 4 will not be able to be secured sufficiently, resulting in the connector units 4 knocking against each other and causing the connections to be blocked.

The present invention was conceived in view of the above circumstances, and it is an aim thereof to provide a fuel cell stacking body that makes possible the use of a connector (connector unit) that can be connected to a plurality of voltage measurement portions at the same time, even when the thickness of the fuel cells is made thin.

SUMMARY OF THE INVENTION

The first aspect of the present invention that has been achieved in order to solve the above described problems is a fuel cell stacking body (for example, the fuel cell stacking body 20 in the preferred embodiments) formed by stacking fuel cells (for example, the fuel cell 21 in the preferred embodiments) that have an electrode assembly (for example, the membrane electrode assembly 22 in the preferred embodiments) and separators (for example, the separators 30 and 32 in the preferred embodiments) that sandwich the electrode assembly, and that generate electricity by being supplied with fuel gas and oxidizer gas, wherein a voltage measuring section (for example, the terminals 50 in the preferred embodiments) that enables a voltage to be measured by being connected to a connector (for example, the connector 60 in the preferred embodiments) that is connected to an external voltage measuring apparatus is provided in a separator; and voltage measuring sections (for example, the terminals 52 in the preferred embodiments) that are adjacent in the stacking direction and that are connected to separate connectors are disposed at different positions from each other with respect to (as seen from) the stacking direction.

By employing the above described structure, it is possible to keep the spacing between adjacent voltage measuring sections that are connected to individually separate connectors and that are placed at the same positions with respect to the stacking direction at a fixed distance or more. Namely, the spacing between each of these voltage measuring sections can be set such that the thickness required by the end portion sides of the connectors, and sufficient spacing to allow separate connectors to be inserted are secured. Accordingly, separate connectors can be connected to the corresponding plurality of voltage measuring sections without knocking against each other even if the thickness of a fuel cell is made thinner and the spacing between separators in which voltage measuring sections are provided is made smaller.

Note that it is preferable that the voltage measuring sections be formed as terminals that protrude outwards from the separator, however, the present invention is not limited to this and it is also possible to form the voltage measuring sections while maintaining the outer configuration of the separator, or by forming grooves cutting into the separator. It is also preferable that each of the voltage measuring sections that are adjacent to each other in the stacking direction and connected to individually separate connectors are positioned so as not overlap each other when looked at from the stacking direction, however, it is also possible for a portion thereof to overlap insofar as this does not hinder the connection of the connectors.

The second aspect of the present invention is a fuel cell stacking body (for example, the fuel cell stacking body 70 in the preferred embodiments), wherein voltage measuring section groups (for example, the terminal groups 72 in the preferred embodiments) are formed by grouping together a plurality of voltage measuring sections that are adjacent in the stacking direction of the fuel cell; and voltage measuring section groups (for example, the terminal groups 74 in the preferred embodiments) that are adjacent in the stacking direction and that are connected to separate connectors (for example, the connector units 76 in the preferred embodiments) are disposed at different positions from each other with respect (as seen from) to the stacking direction.

By employing the above described structure, it is possible for only the spacings between voltage measuring sections that are connected to separate connectors from among the voltage measuring sections in the same position when seen from the stacking direction to be set such that the thickness required by the end portion sides of the connectors as well as sufficient spacing to allow the connectors to be inserted are secured. Accordingly, the spacing between voltage measuring sections connected to the same connector can be narrowed to just enough so that the voltage measuring sections do not come into contact with each other. As a result, it is possible to increase the number of voltage measuring sections that are connected to the same connector. Moreover, because it is only necessary to match and connect a connector to each of the voltage measuring section groups, the task of connecting the connector to the voltage measuring section is simplified. Moreover, it is possible to closely group together areas where the voltage measuring sections are located as the voltage measuring section groups.

The third aspect of the present invention is a fuel cell stacking body (for example, the fuel cell stacking body 100 in the preferred embodiments), wherein voltage measuring sections that are adjacent in the stacking direction of the voltage measuring section groups are disposed at different positions from each other with respect to (as seen from) the stacking direction.

By employing the above described structure, because it is possible to disperse the locations of the voltage measuring sections even further while maintaining their grouping as a voltage measuring section group, it is possible to make the spacing between separators on which voltage measuring section groups are formed even smaller.

The fourth aspect of the present invention is a fuel cell stacking body (for example, the fuel cell stacking body 90 in the preferred embodiments), wherein at least a portion (for example, the terminals 50 and 82 in the preferred embodiments) of the voltage measuring sections that are adjacent in the stacking direction are disposed on one side with respect to (as seen from) the stacking direction.

By employing the above described structure, it becomes possible to group together areas where the voltage measuring sections are located even more closely, and to increase the degree of freedom allowed when positioning other devices and the like in the other areas.

DESCRIPTION OF THE PREFERRED EMBODIMENTS

Figure 1:
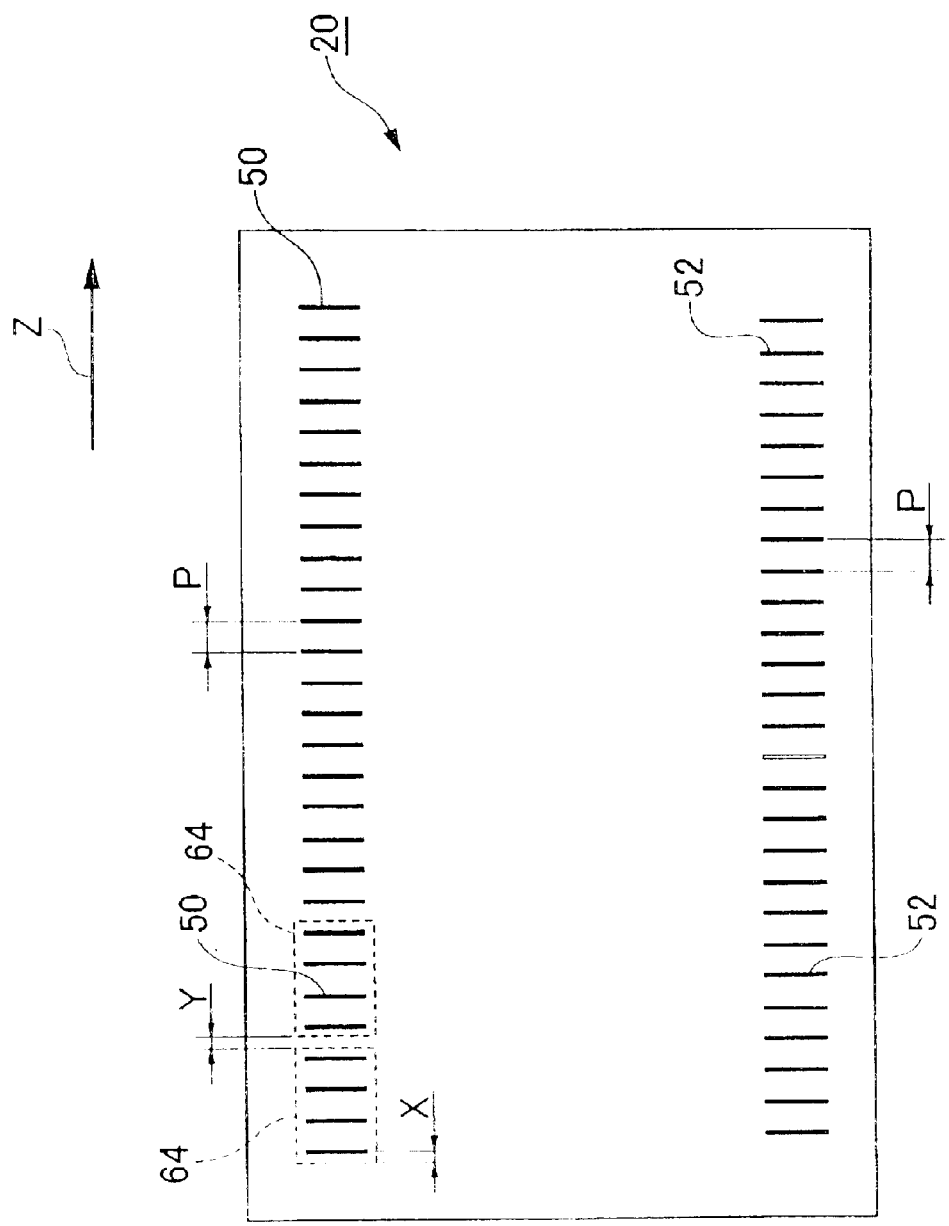
FIG. 1 is a plan view showing a fuel cell stacking body according to the first embodiment of the present invention.

The fuel cell stacking body according to the embodiments of the present invention will now be described while referring to the drawings.

Figure 7:
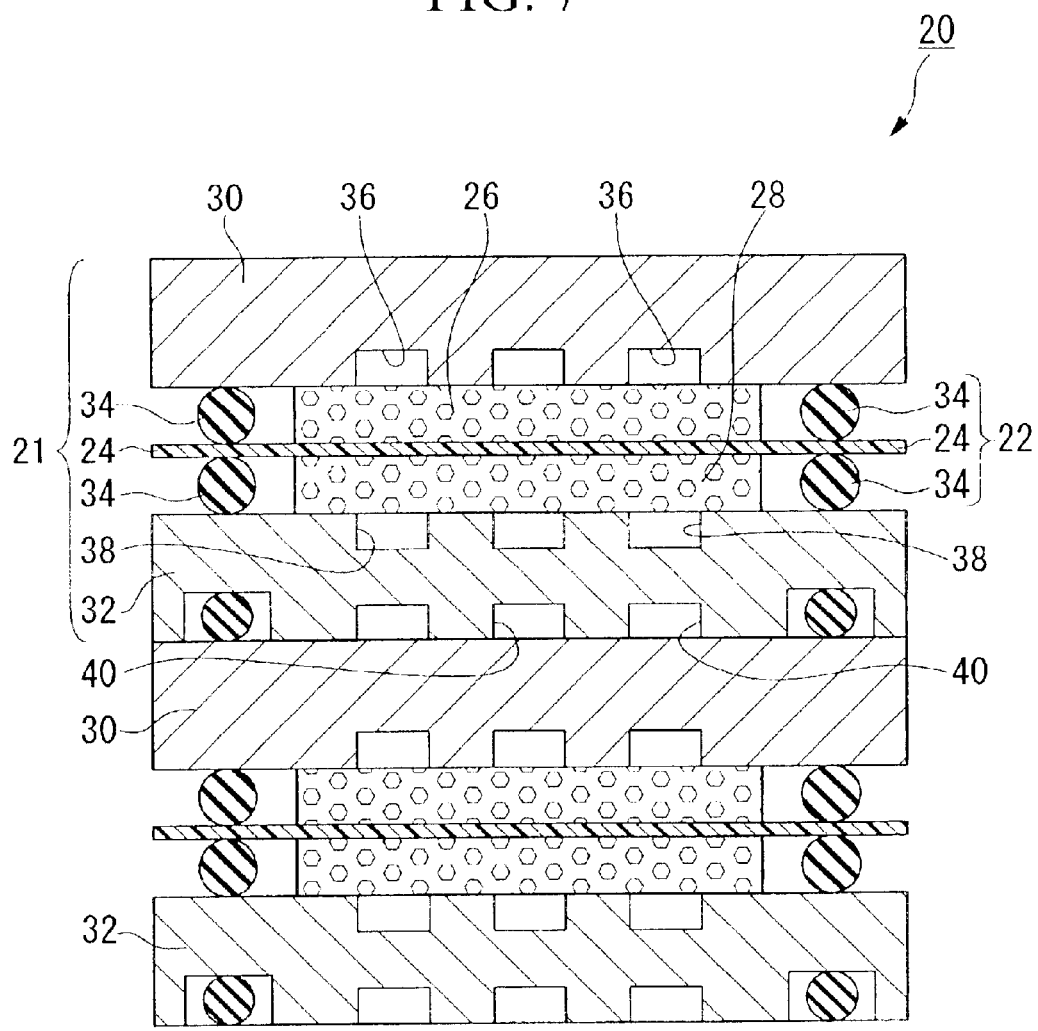
FIG. 7 is a cross-sectional view showing a fuel cell stacking body according to the first embodiment of the present invention.

FIG. 7 is a cross-sectional view showing a fuel cell stacking body 20 according to the first embodiment of the present invention. In FIG. 7, the symbol 22 indicates a membrane electrode assembly. This membrane electrode assembly 22 is formed by a solid polymer electrolyte membrane 24, and gas diffusion layers (an anode gas diffusion layer and a cathode gas diffusion layer) 26 and 28 provided on either side of the solid polymer electrolyte membrane 24. Between the solid polymer electrolyte membrane 24 and each of the gas diffusion layers 26 and 28 are formed catalyst layers (not shown). On the two surfaces of the membrane electrode assembly 22 are provided a pair of separators 30 and 32. Annular sealing members 34 are set at the peripheral edge sides of facing surfaces of the two separators 30 and 32. The solid polymer electrolyte membrane 24 is sandwiched by these sealing members 34, and in this state the membrane electrode assembly 22 is held by the two separators 30 and 32. The above described structure forms a fuel cell 21. Gas communication paths 36 and 38 and a cooling medium communication path 40 used respectively to supply fuel gas, oxidizer gas, and cooling medium are formed in the two separators 30 and 32.

In a fuel cell 21 structured as described above, if fuel gas (for example, oxygen gas) is supplied to a reaction surface of the anode diffusion layer 26 via the gas communication path 36, hydrogen is ionized by the catalyst layer, and moves to the cathode diffusion layer 28 side via the solid polymer electrolyte membrane 24. Electrons generated between these two are extracted to an external circuit and used as direct current electrical energy. Because oxidizer gas (for example, air that contains oxygen) is supplied to the cathode diffusion layer 28, hydrogen ions, electrons, and oxygen react to generate water.

Figure 8:
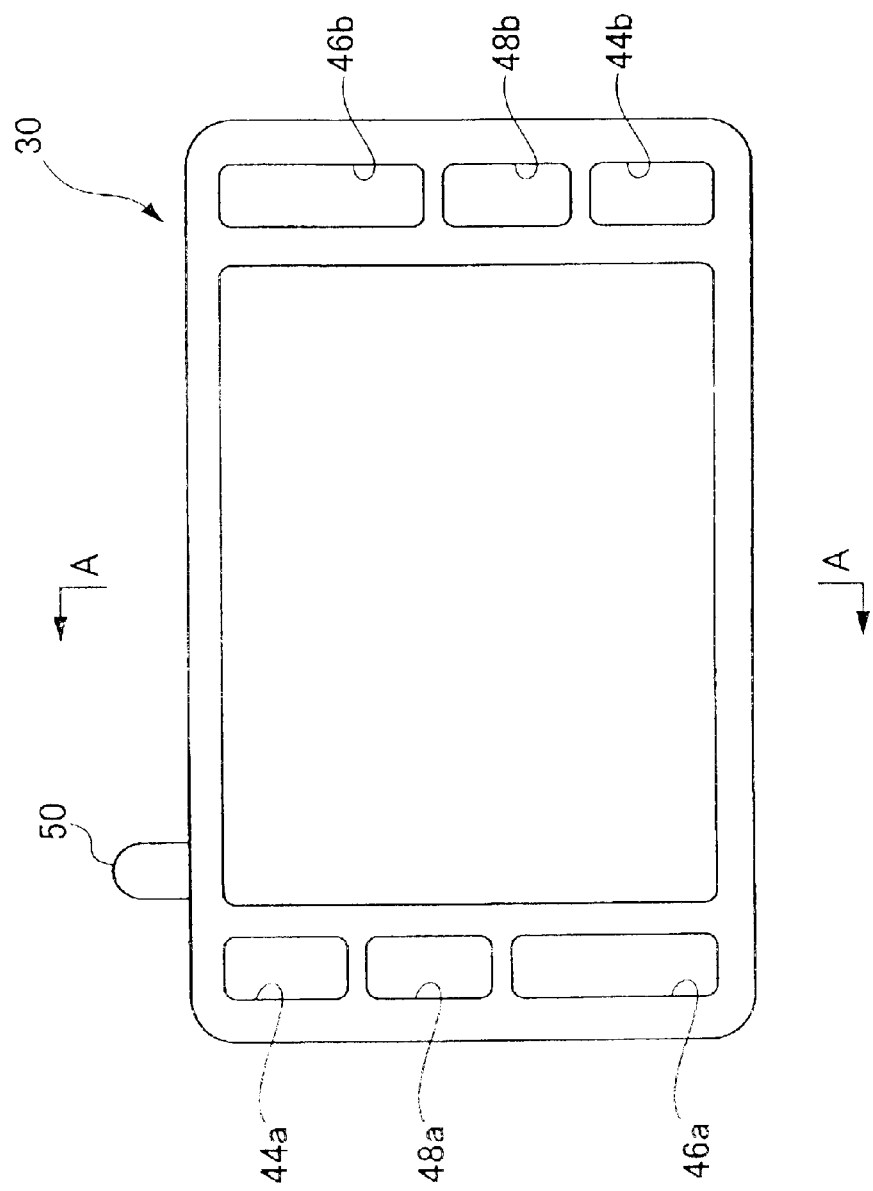
FIG. 8 is a plan view showing a separator according to the first embodiment of the present invention.
Figure 9:
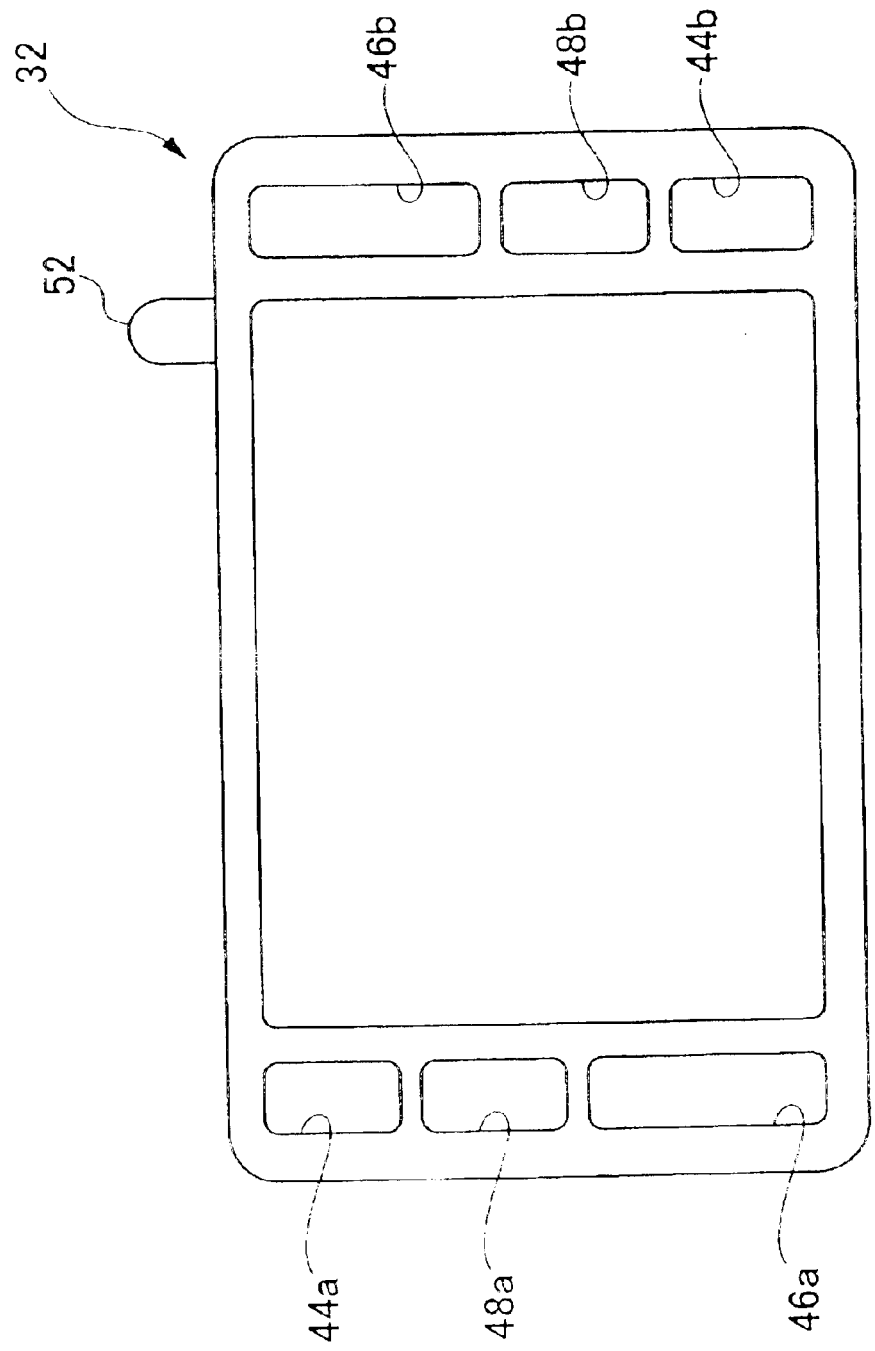
FIG. 9 is a plan view showing a separator according to the first embodiment of the present invention.
Figure 10:
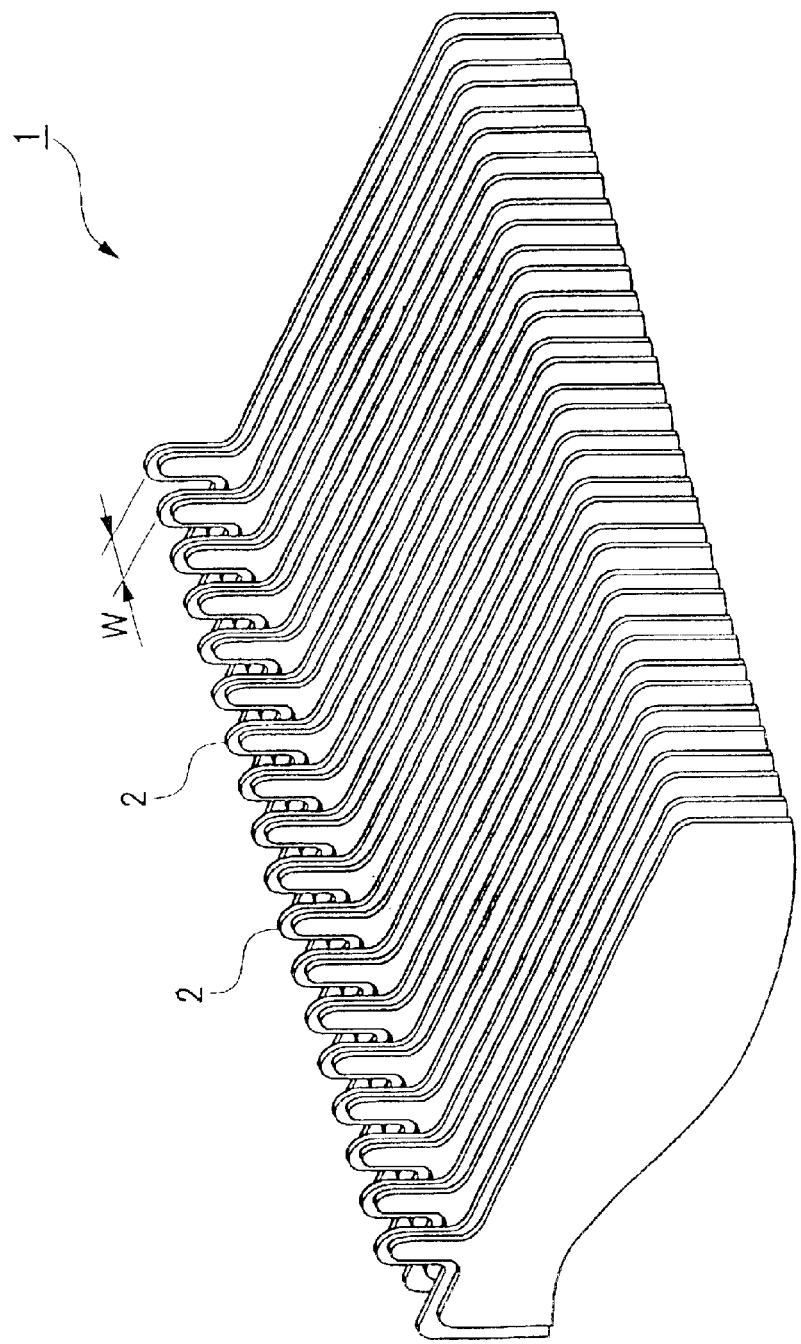
FIG. 10 is a perspective view showing a conventional fuel cell stacking body.
Figure 11:
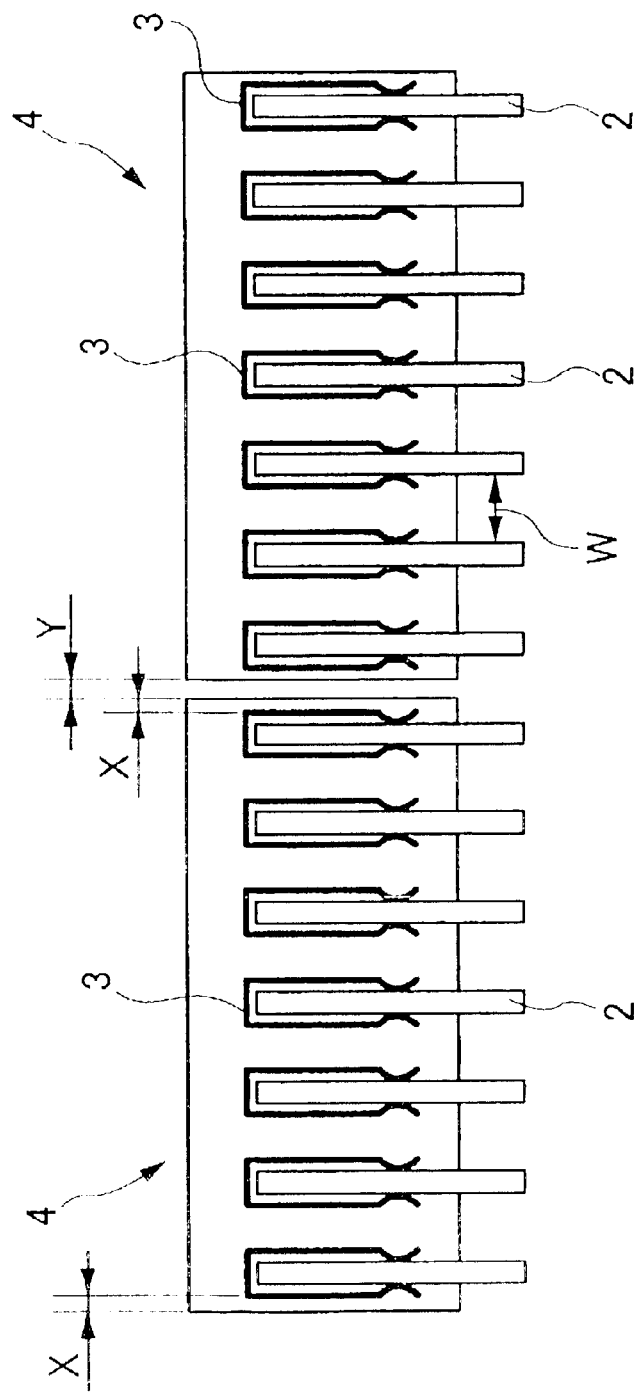
FIG. 11 is an explanatory view showing problem points in a conventional fuel cell stacking body.

FIGS. 8 and 9 are plan views of the separator 30 and the separator 32 of the present embodiment. As is shown in FIGS. 8 and 9, fuel gas communicating holes 44a and 44b, oxidizer gas communicating holes 46a and 46b, and cooling medium communicating holes 48a and 48b are formed on both sides of each separator 30 and 32. One side of these communicating holes (the left side on the drawings) are supply apertures 44a, 46a, and 48a, while the other side of these communicating holes (the right side on the drawings)

are discharge apertures 44b, 46b, and 48b. The separators 30 and 32 that are formed in this way sandwich the membrane electrode assembly 22, thereby forming the fuel cell 21 (see FIG. 7). Note that the separators may be formed by performing a cutting process on carbon or the like, or by press-working a metal or the like.

Terminals 50 and 52 used for voltage detection are provided respectively in the separators 30 and 32 of the fuel cell 21. As is shown in FIGS. 8 and 9, the terminals 50 and 52 are formed at the same end surface of the separators 30 and 32, and also at different positions with respect to the stacking direction (i.e., in the plan view direction of the drawings). Note that FIG. 7 is a cross-sectional view seen from the direction AA in FIG. 8, and the terminals 50 and 52 have been omitted from FIG. 7 in order to simplify the drawing.

Figure 6:
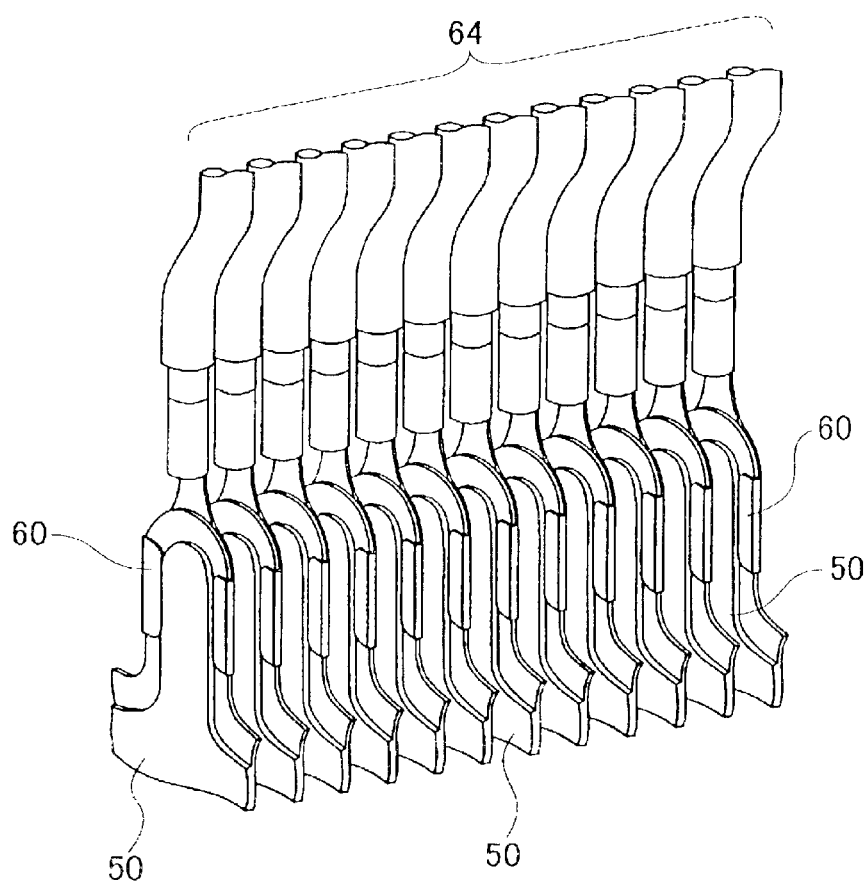
FIG. 6 is an explanatory view showing a state of connection of terminals with connectors.

FIG. 1 is a plan view showing the fuel cell stacking body 20 according to the first embodiment of the present invention. Note that in the following drawings, the arrow Z indicates the stacking direction. As is shown in FIG. 1, with respect to the stacking direction, the terminals 50 and 52 are arranged stacked in two rows alternately approaching the end portion sides of each of the separators 30 and 32. As is shown in perspective view in FIG. 6, the terminals 50 that are stacked in this way are integrally connected to a connector unit 64 that holds connectors 60 that are connected to each of the terminals 50. As a result, it is possible to perform in one operation the measurement of the voltages of each of the terminals 50 that are connected to the connector unit 64 without the wiring becoming entangled. The same applies to the terminals 52.

In the present embodiment, the spacings P between the terminals 50 (and between the terminals 52) that are in the same position with respect to the stacking direction are kept at a size that allows each connector unit 64 to be inserted. Namely, as is shown in FIG. 1, at the spacing P, the thickness X required by the end portion of the connector unit 64 is secured, and the spacing Y between connector units 64 when they are connected to the terminals 50 or 52 is secured. Namely, the positions of adjacent terminals 50 and 52 are shifted such that the spacing P between any two terminals 50 or two terminals 52 at the same position with respect to the stacking direction is kept at a spacing that allows a connector unit 64 to be inserted. Accordingly, it is possible to use connector units 64 even if the size of stacked fuel cells 21 is reduced and the spacing between each is lessened. Therefore, it is simple to measure the voltage of each fuel cell 21.

Moreover, in the present embodiment, as is described above, the terminals 50 and 52 are provided on the same surface of the separators 30 and 32. Therefore, it is possible to place an apparatus such as a control unit (ECU) on the other surface of the separators 30 and 32, thereby increasing the usability thereof. Note that, in the present embodiment, a structure is employed in which the terminals 50 and 52 are formed as protrusions on the external side of the end surface of the separators 30 and 32 are inserted into the connectors 60, however, it is also possible to employ a structure in which the terminals 50 and 52 are formed as grooves on the inner side of the end surface of the separators 30 and 32 and the connectors 60 are inserted into these grooves. Alternatively, the terminals 50 and 52 may be built in integrally without the outer shape of the separators 30 and 32 being changed.

Figure 2:
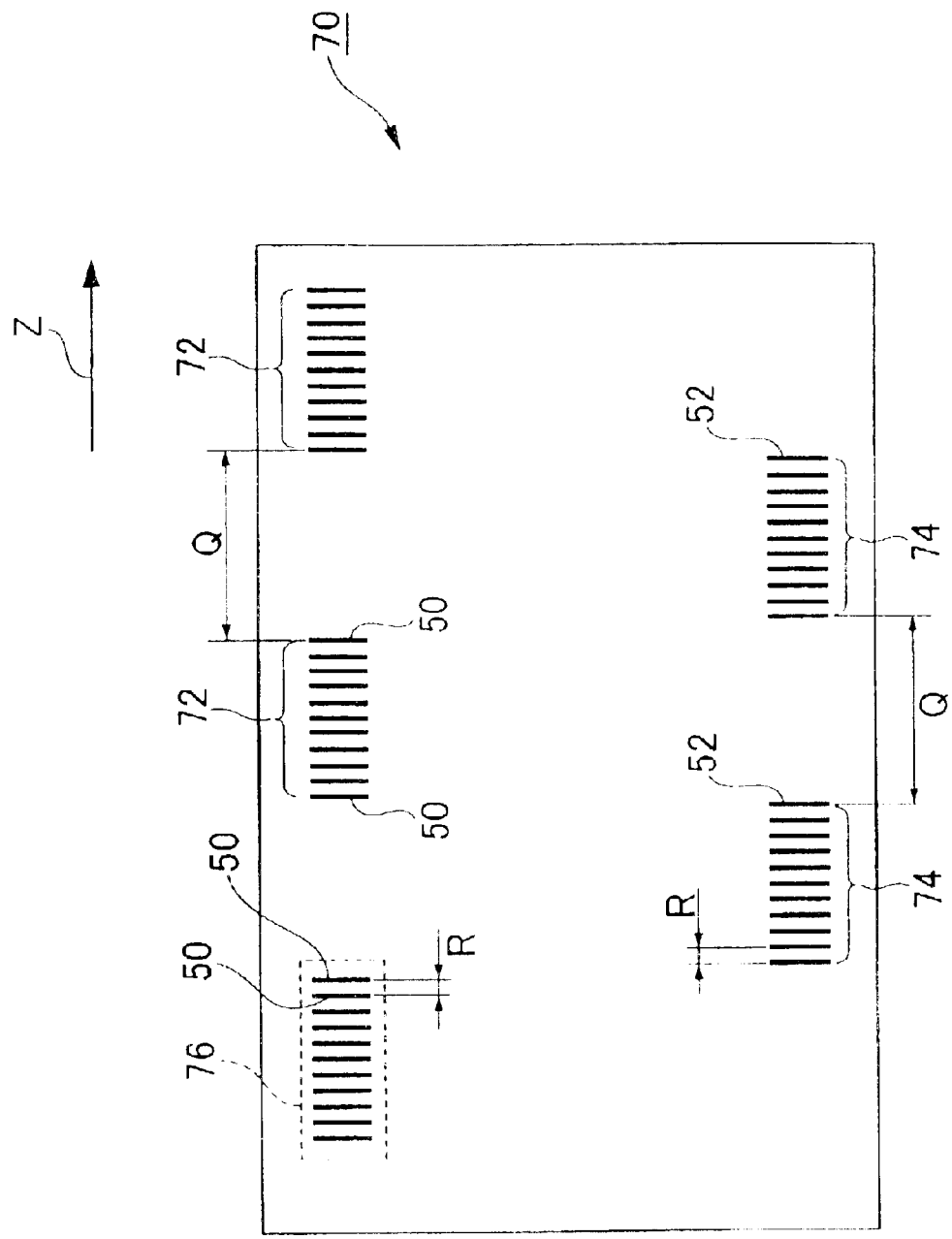
FIG. 2 is a plan view showing a fuel cell stacking body according to the second embodiment of the present invention.

The fuel cell stacking body 70 according to the second embodiment of the present invention will now be described while referring to FIG. 2. In the description given below, members that are the same as those in the first embodiment are given the same descriptive symbols and a description thereof is omitted. In the present embodiment terminal groups 72 and 74 are formed by grouping together a plurality of the terminals 50 and 52. These terminal groups 72 and 74 are formed such that their positions are shifted from each other with respect to the stacking direction, and the spacing Q between the terminal groups 72 and 74 is kept at a size that allows the insertion of connector units 76. By employing such a structure the plurality of connectors 60 of the connector unit 76 can be connected to each of the corresponding terminal groups 72 and 74, and the voltages of the connected terminal groups 72 and 74 can be measured in one operation.

In addition, in the present embodiment the spacing R between each of the terminals 50 or between each of the terminals 52 that are connected to the same connector unit 76 is reduced to such a size that the terminals are prevented from coming into contact with each other by only a small gap. Accordingly, it is possible to increase the number of terminals 50 (or terminals 52) that are connected to the same connector unit 76. Moreover, because it is only necessary to match and connect a connector unit 76 to each of the terminal groups 72 and 74, the task of connecting the connector unit 76 to the terminal groups 72 and 74 is simplified. By closely grouping together the areas where the terminals 50 and 52 are located as the terminal groups 72 and 74 it is possible to increase the degree of freedom allowed when positioning other devices and the like in the other areas.

Figure 3:
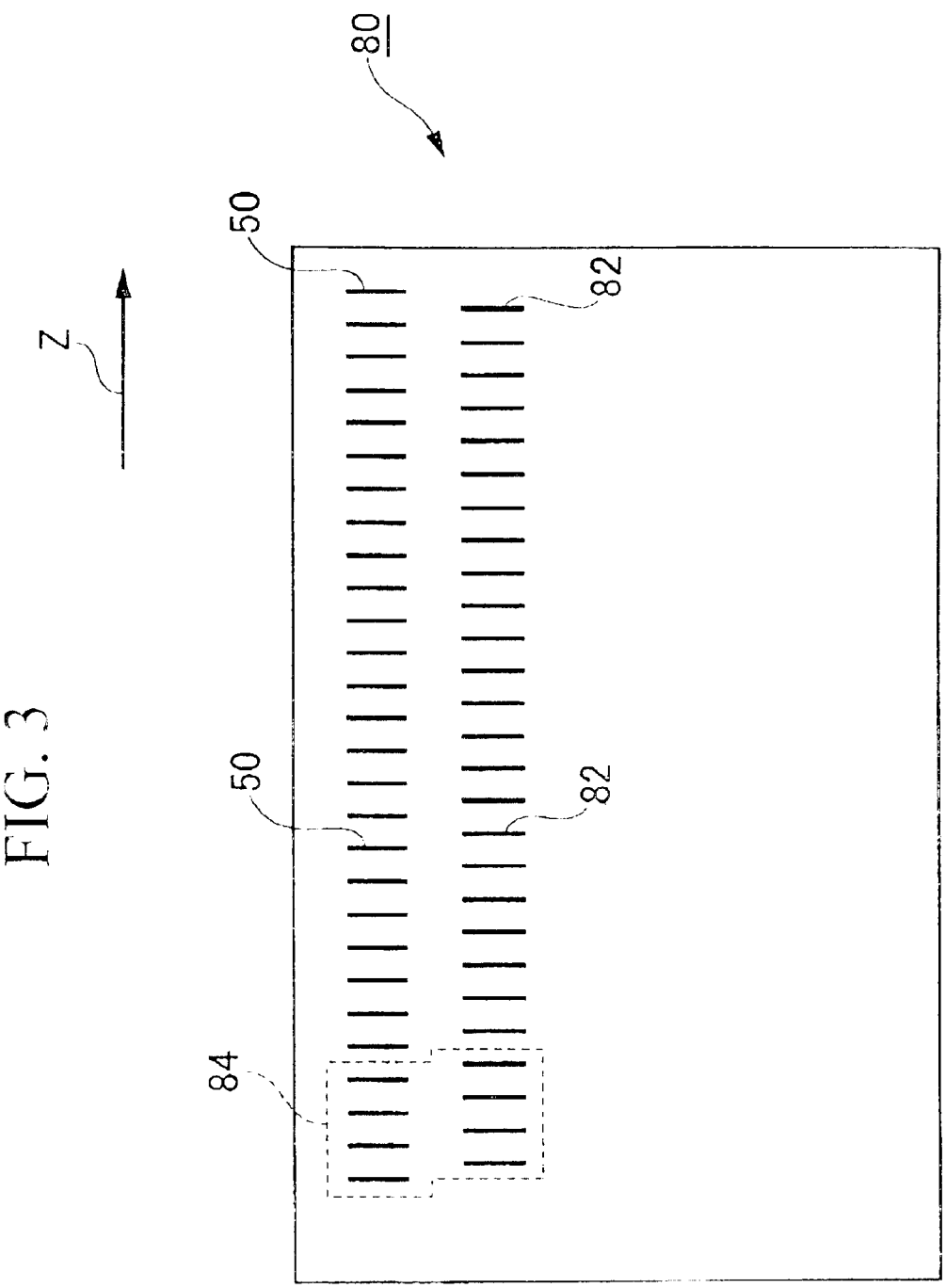
FIG. 3 is a plan view showing a fuel cell stacking body according to the third embodiment of the present invention.

The fuel cell stacking body 80 according to the third embodiment of the present invention will now be described while referring to FIG. 3. In the present embodiment the terminals 52 shown in the first embodiment are formed as terminals 82 that are located at a position close to the terminals 50 with respect to the stacking direction. By placing the terminals 50 and 82 on one side with respect to the stacking direction in this way it is possible to group the areas where the terminals 82 are formed even more closely together. As a result, the convenience of this embodiment such as the degree of freedom allowed when positioning other devices and the like is even greater than in the first embodiment. In addition, because a connector unit 84 that enables the terminals 50 and 82 to be connected together in one operation is used, the measurement of the voltages of the terminals 50 and 82 is simplified even further.

Figure 4:
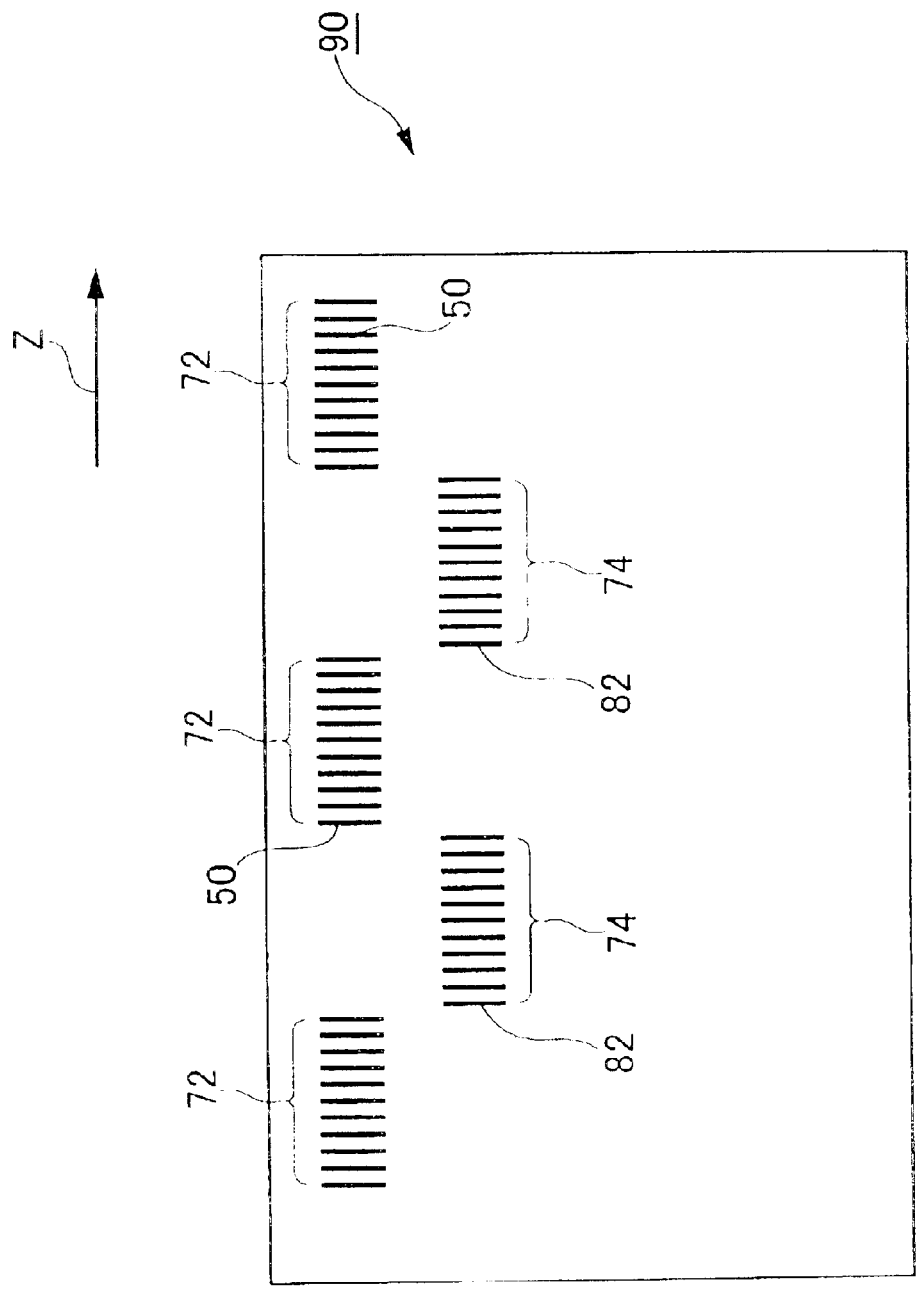
FIG. 4 is a plan view showing a fuel cell stacking body according to the fourth embodiment of the present invention.

The fuel cell stacking body 90 according to the fourth embodiment of the present invention will now be described while referring to FIG. 4. The present embodiment differs from the second embodiment in that the terminal groups 74 shown in the second embodiment are located at positions close to the terminal groups 72 with respect to the stacking direction. By employing such a structure, in addition to the effects described in the second embodiment, the convenience is increased in the same way as in the third embodiment. Note that in the above described embodiments a description is given of when two rows of terminals or terminal groups are arranged in the stacking direction, however, the present invention is not limited to this and it is also possible to provide three rows or more at different positions in the stacking direction.

Figure 5:
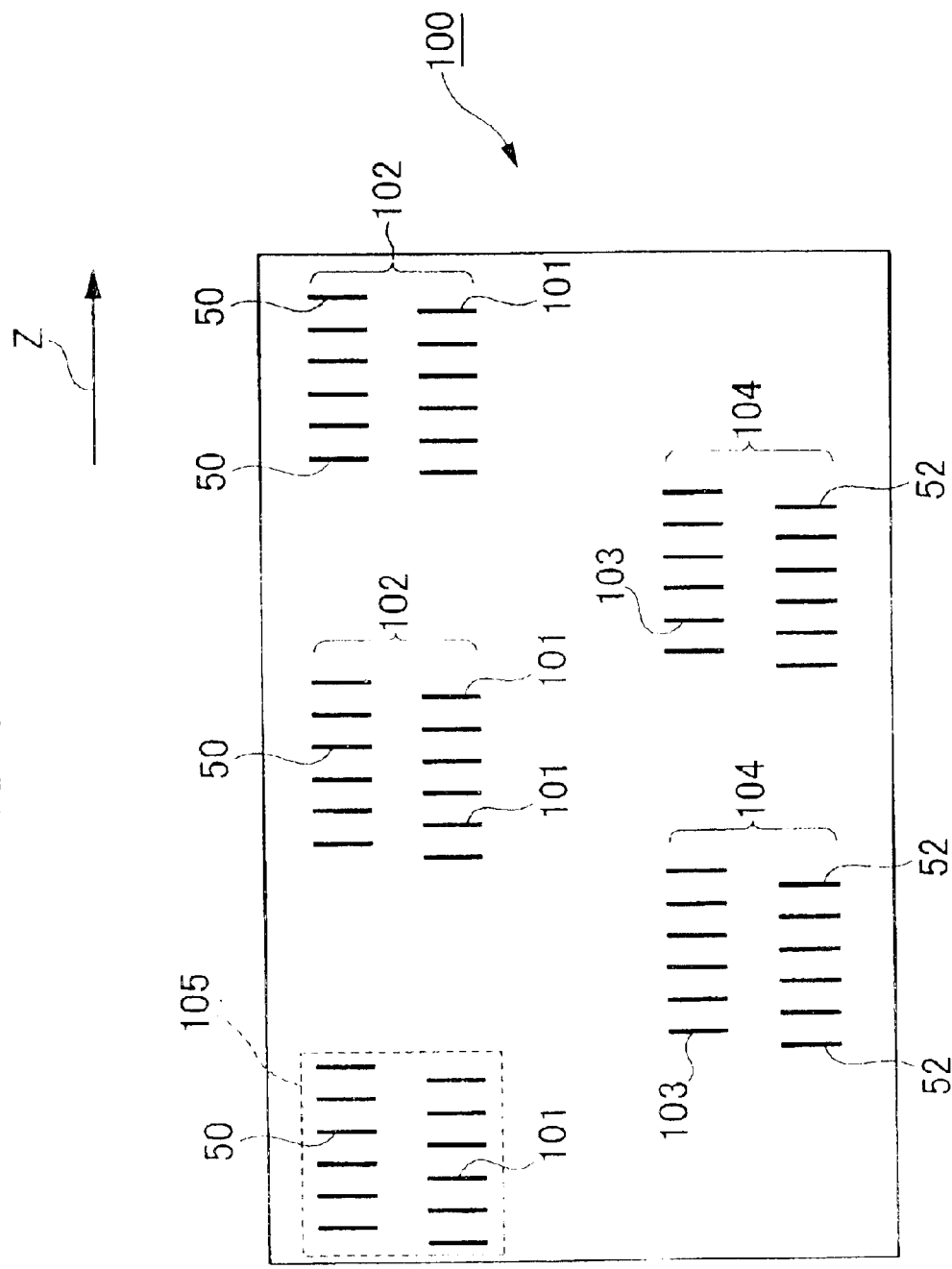
FIG. 5 is a plan view showing a fuel cell stacking body according to the fifth embodiment of the present invention.

The fuel cell stacking body 100 according to the fifth embodiment of the present invention will now be described while referring to FIG. 5. In the present embodiment terminals adjacent to the terminals 50 shown in the first embodiment are shifted to form terminals 101, while terminals adjacent to the terminals 52 shown in the first embodiment are shifted to form terminals 103. A terminal group 102 is formed by the terminals 50 and 101, while a terminal group 104 is formed by the terminals 52 and 103. The terminal groups 102 and the terminal groups 104 are provided at different positions from each other in the stacking direction. In this way, because the respective terminals are even more widely dispersed, it is possible to maintain the necessary spacing even if the size of the fuel cell 21 is further reduced. Moreover, in the same way as in the third and fourth embodiments, the terminal groups 102 and 104 may be placed in proximity to each other with respect to the stacking direction.

Note that in the above described embodiment a description is given of when each of the terminals that are adjacent in the stacking direction or each of the terminal groups that are adjacent in the stacking direction are provided at different positions in the stacking direction, however, it is also possible for only a portion, at least, of the terminals or terminal groups to be provided at different positions. Moreover, in each of the above described embodiments the terminals or terminal groups are provided at the same end surface side of the separators, however, it is also possible when necessary for these to be provided at different end surface sides.

As has been described above, according to the first aspect of the present invention, because it is possible to connect separate connectors to the corresponding plurality of voltage measuring sections even if the thickness of the fuel cell is made thinner, it is possible to measure the voltages of all the voltage measuring sections that are connected to the respective connectors in a single operation, thereby simplifying the task of voltage measurement.

According to the second aspect of the present invention, because it is possible to connect separate connectors to the each of the corresponding voltage measuring section groups even if the thickness of the fuel cell is made thinner, it is possible to measure the voltages of the connected terminals in a single operation, thereby simplifying the task of voltage measurement. In addition, because it is possible to increase the number of voltage measuring sections connected to the connectors, an excellent effect cost-wise is also obtained. Furthermore, because it is possible to group closely together as a voltage measuring section group the areas where the voltage measuring sections are placed, it is possible to increase the degree of freedom allowed when positioning other devices and the like in the remaining areas.

According to the third aspect of the present invention, because it is possible to connect separate connectors to the each of the corresponding plurality of voltage measuring section groups even if the thickness of the fuel cell is made thinner, the size of the fuel cell can be made even smaller.

According to the fourth aspect of the present invention, it is possible to position other devices such as control devices (ECU) on the other side looking from the stacking direction from the side where terminals or terminal groups are positioned, thereby increasing the advantages of the fuel cell.

What is claimed is:

1. A fuel cell stacking body having stacked fuel cells that have an electrode assembly and separators holding the electrode assembly therebetween, and that generate electricity by being supplied with fuel gas and oxidizer gas, comprising:

voltage measuring sections, provided in the separators and connected to a connector that is connected an external voltage measuring apparatus, that measures a voltage, wherein the voltage measuring sections that are adjacent in the stacking direction and that are connected to separate connectors are disposed at different positions from each other with respect to the stacking direction.

2. The fuel cell stacking body according to claim 1, wherein voltage measuring section groups are formed by grouping together a plurality of voltage measuring sections that are adjacent in the stacking direction of the fuel cell; and the voltage measuring section groups that are adjacent in the stacking direction and that are connected to separate connectors are disposed at different positions from each other with respect to the stacking direction.

3. The fuel cell stacking body according to claim 1, wherein voltage measuring sections that are adjacent in the stacking direction of the voltage measuring section groups are disposed at different positions from each other with respect to the stacking direction.

4. The fuel cell stacking body according to 1, wherein at least a portion of the voltage measuring sections that are adjacent in the stacking direction are shifted with respect to the stacking direction.

5. The fuel cell stacking body according to 2, wherein at least a portion of the voltage measuring sections that are adjacent in the stacking direction are shifted with respect to the stacking direction.

6. The fuel cell stacking body according to 3, wherein at least a portion of the voltage measuring sections that are adjacent in the stacking direction are shifted with respect to the stacking direction.

\* \* \* \* \*